Oct. 31, 1933.                 J. HOLTZMAN                 1,933,113
                       AUTOMOBILE STEERING WHEEL LOCK
                       Filed Jan. 20, 1923          2 Sheets-Sheet 1
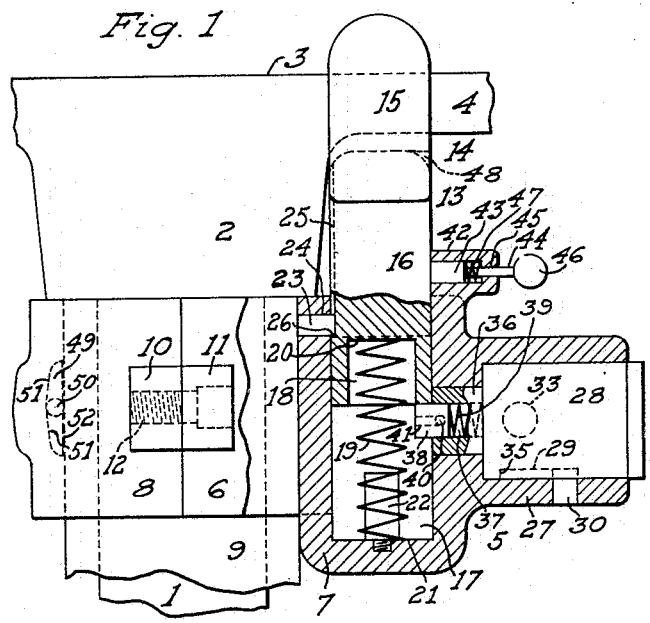
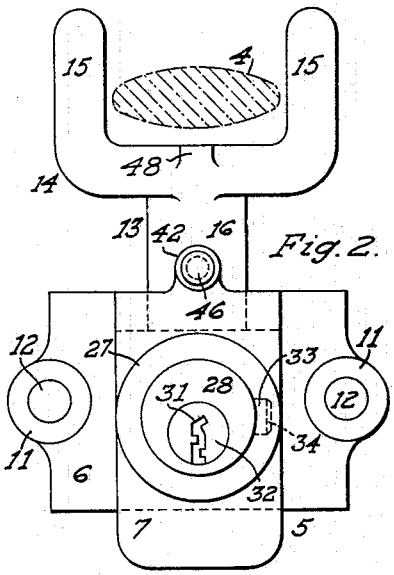
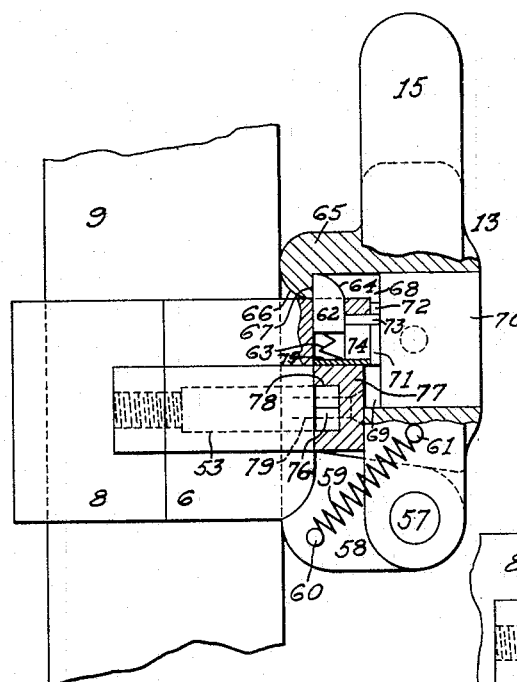
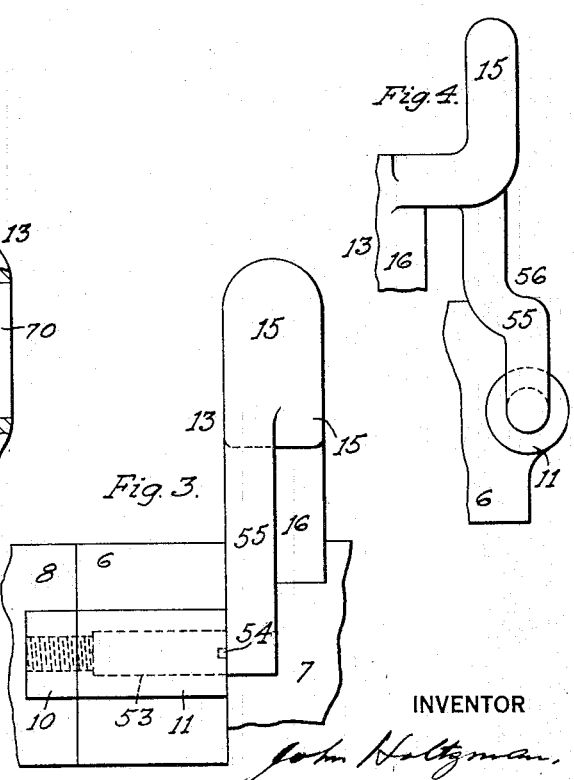
INVENTOR
John Holtzman
BY ATTORNEY Oct. 31, 1933.  J. HOLTZMAN  1,933,113
AUTOMOBILE STEERING WHEEL LOCK
Filed Jan. 20, 1923   2 Sheets-Sheet 2
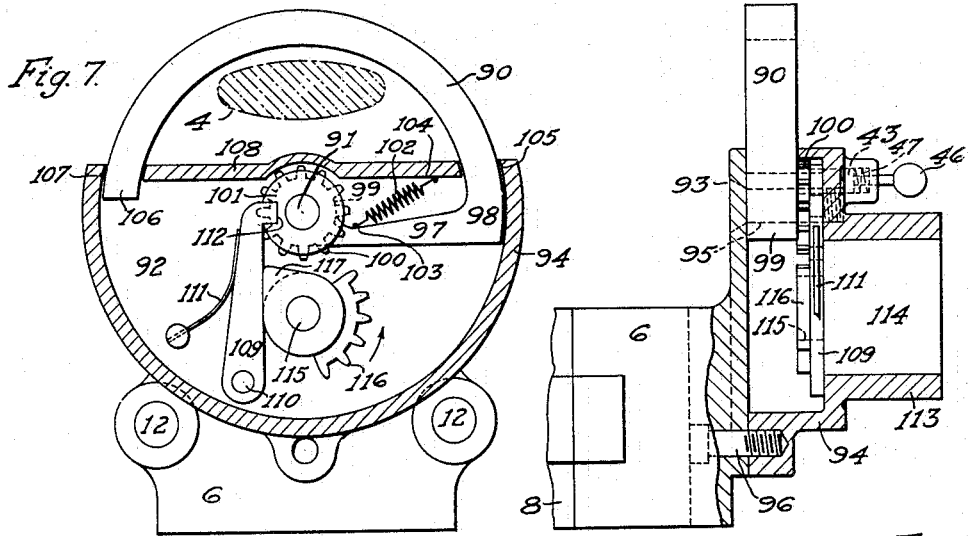
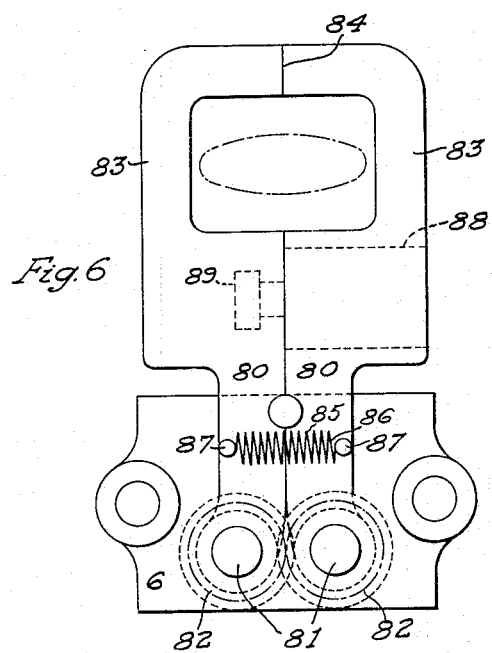

Patented Oct. 31, 1933

1,933,113

UNITED STATES PATENT OFFICE 1,933,113

AUTOMOBILE STEERING WHEEL LOCK

John Holtzman, New York, N. Y., assignor of one-half to Benjamin Roman, New York, N. Y.

Application January 20, 1923. Serial No. 614,008

9 Claims. (Cl. 70—129)

This invention relates to devices for locking the steering wheel of an automobile to prevent the theft or unauthorized use of the machine, and its principal object is to provide a simplified, conveniently and economically manufacturable, conveniently operable, strong, durable, secure, efficient, and improved device for this purpose.

Another object is to provide the device with means for automatically actuating the steering wheel engaging member thereof into its operative position.

Another object is to provide the device with means for automatically actuating the steering wheel engaging member thereof into its inoperative position.

A further object is to provide the device with improved auxiliary means for securing it to the steering post of the machine without necessitating any cutting into the post or any other member when installing the device.

A further object is to provide the device with means for actuating the steering wheel engaging member thereof into its operative position by manipulation of the locking key.

A further object is to provide the device with means for actuating the steering wheel engaging member thereof into its inoperative position by manipulation of the locking key.

A further object is to provide the device with means whereby the steering wheel engaging member thereof will embrace the spoke around its top and two sides, and will be movable to its inoperative position in a concealed state within the lock casing.

A further object is to provide the device with improved means for preventing the removal of the steering wheel from the steering column.

Other objects and advantages will hereinafter appear.

In the accompanying drawings,—

Fig. 1 is a cross-sectional side elevation of the steering wheel lock.

Fig. 2 is a front elevation of the lock shown in Fig. 1.

Figs. 3, 4, 5, 6, 7 and 8 show modifications of the invention.

To the steering post 1 is secured the hub 2 of the usual steering wheel 3 having several spokes 4 which are joined to the wheel-rim, not shown. The lock 5 is secured in position by means of a half sleeve member 6, forming part of its casing 7, being bolted to a similar half sleeve member 8 and these members gripping the steering column 9. This bolting is performed by means of providing the sleeve members 6, 8 with ears 10, 11, passing headless bolts 12 through the ears 11 and threading them into the ears 10, and then forcefully tightening these bolts so as to cause said sleeve members to powerfully grip the steering column 9.

In the casing 7 is slidably mounted an engaging member 13, for any one of the spokes 4, comprising a forked end 14, having a pair of upright arms 15, and a shank 16 which is slidable upwardly and downwardly in the bore 17 of the casing. The shank 16 is provided with a recess 18 in its underside, and a spring 19 located in the bore 17 of the casing bears upwardly against the roof 20 of said recess and downwardly against the floor 21 of said bore; the upper end of the spring being thus retained within the recess 18 and the lower end of said spring being coiled around a pin 22 fixed to the floor 21, and said spring being located around said pin and between it and the wall of said recess when the shank 16 is in depressed position. A pin 23 is driven through the wall 24 of casing 7 and into a slot 25 formed in the shank 16, by means of which the engaging member 13 is maintained against rotation about its longitudinal axis and its upward stroke is limited by the ledge 26 at the end of slot 25 abutting against the pin 23. Pressing downwardly upon the engaging member 13 causes it to sink and compress the spring 19, until the bottom of its shank 16 strikes the floor 21 and the arms 15 clear the bottom of the spoke 4, and releasing of the member 13 causes said spring to slide it upwardly to the operative position shown with its forked end 14 embracing the spoke 4. The casing 7 is provided with a socket 27 in which there is mounted a locking cylinder 28 adapted to slide longitudinally inwardly and outwardly, and toward and away from the shank 16 and perpendicularly thereto. Said cylinder is provided with a slot 29, and a pin 30 is driven through the wall of socket 27 and into the slot 29, by which means rotation of cylinder 28 about its axis is prevented, the cylinder is guided in its inward and outward sliding strokes and the said strokes are limited. When the cylinder is in its inward position shown and the key is inserted into the opening 31 and the locking barrel 32 is therewith rotated the latter manipulates mechanism, not shown, which mechanism causes a locking pin 33 to emerge from the cylinder 28 and enter a recess 34 provided in the socket-wall 27, while contrary rotation of the lock-key and locking barrel 32 causes the pin 33 to clear out of the recess 34, thereby permitting the cylinder 28 to be withdrawn from the socket until the ledge 35 of slot 29 abuts against the stop-pin 30. This type of locking cylinder 28 and its mode of operation are well known and no further detailed description of its internal parts or operation is therefore necessary. The cylinder 28 is provided at its rear with a projection 36 having a bore 37 within which there is slidably mounted a latch 38 that is normally pressed outwardly by a spring 39 located within said bore. A pin 40 passing through the wall of the projection 36 enters a slot 41 formed in the latch 38, by which means the latter is held against axial rotation and is guided in its movement into and out of the bore 37. When the cylinder 28 is unlocked and withdrawn from the socket 27 the latch 38 is carried along therewith from the position shown and caused to clear the bore 17. When the cylinder 28 is slid back and locked with the key in the position shown, while the engaging member 13 is in depressed state, the detent 38 is thereby set into contact with the shank 16 and under pressure of the spring 39. The casing 7 is provided with a small socket 42, directly above the socket 27, in which there is mounted a detent 43 adapted to slide longitudinally inwardly and outwardly, and toward and away from the shank 16 and perpendicularly thereto. To the detent 43 is secured a stem 44 which passes through an opening 45 in the socket and is provided at its terminal with a ball 46 serving as a finger piece. A spring 47 located within the socket 42 is coiled around the stem 44 and continually presses against the detent 43.

When it is desired to unlock the steering-wheel 3, the cylinder 28 is first unlocked with its key and the cylinder is drawn out from its socket 27. The engaging member 13 may be then pressed downwardly as far as it will go and the arms 15 thereby made to clear the spoke 4.

Thereupon the spring 47 projects the detent 43 into the path of the engaging member 13, and a lug 48 forming part of the shank 16 abuts against this detent, thereby locking the engaging member 13 in its depressed state, contrary to the upward pressure exerted thereagainst by the spring 19. When it is desired to lock the steering-wheel 3, it merely requires bringing any one of the spokes 4 opposite to the arms 15 and drawing the ball 46, whereupon the detent 43 is drawn out of the path of the engaging member 13, the latter is slid upwardly by the spring 19 into engagement with the spoke 4, and the detent 38 is then projected by the spring 37 into the position shown in locked engagement with the member 13, whereby the latter is securely locked against any downward dislocation.

As the sleeve members 6, 8, sometimes tend to loosen their grip of the steering column 9, due to unequal expansion and contraction of these parts or a tendency of the bolts 12 to loosen, the entire lock 5 sometimes tends to slide downwardly along the post or the same may be under the said circumstances deliberately forced downwardly by a thief, in order to thereby unlock the steering wheel. To avoid such contingency one of the sleeve members 8, is provided with a recess 49 facing the steering column 9, and a ball or disk 50 is lodged within said recess and against the post in the manner shown. Any attempt, therefore, to force the lock 5 downwardly will cause the disk 50 to bind between the angular wall 51 of said recess and the steering column 9 and will thereby prevent any wrongful dislocation of the sleeve-members 6, 8. In order to facilitate handling of these parts in the sale and installation of the lock a sheet 52 of paper or other suitable substance may be pasted over the recess 49 to temporarily retain the disk 50 in place, and when the sleeves 6, 8 are mounted upon the steering post the said sheet may remain in its place, so as to incidentally act as a more efficient binding means between the post and the sleeve.

According to the modification shown in Figs. 3, 4, the ears 11 are made to extend up to a point in the plane of the rear side of the engaging member 13, and the bolts 53 are lengthened accordingly and provided with slots 54 for a screw driver, whereby these bolts are rendered removable for removal of the lock from the steering column 9, in contradistinction to the type of bolts 12 which cannot be removed and permanently secure the lock 5 to the post. In order to prevent unauthorized removal of the bolts 53, for the purpose of removing the lock 5 to unlock the steering wheel, the arms 15 are provided with projections 55 that serve to cover the bolt-heads when the lock is in locked operative engagement with the steering wheel, whereby no access can be had to the bolts 53 with a screw-driver or any other instrument. When the lock is in inoperative state, with its engaging member 13 depressed, the bolts 53 are opposite to the bend 56 in the projection 55, which thereby clear the bolts and the same may be unthreaded to remove the lock, if desired.

In the modification shown in Fig. 5, the engaging member 13 is hinged at 57 to a lug 58 projecting from the sleeve member 6, whereby said engaging member is swingable about its hinge from its upright or operative position shown to a downwardly hanging or inoperative position. A spring 59, joined at one end 60 to the lug 58 and at its other end 61 to the engaging member 13, positively holds the latter in its operative position shown, and when the engaging member is swung downwardly to its inoperative position this spring similarly retains it positively in the latter position. In its operation, the spring 59 is stretched during the swinging travel of the member 13 from its upright position to a midway or horizontal position, and for the rest of its downward swinging stroke the spring automatically actuates it to its inoperative position. Similarly, when the engaging member 13 is swung upwardly the spring 59 is stretched until the member assumes a horizontal position, and for the rest of its upward stroke the spring automatically actuates it to its operative position shown. This lock latches automatically by means of a detent 62 which is normally pressed upwardly to the position shown by a spring 63. Said detent is provided with a cam-face 64 and the engaging member 13 is provided with a projection 65 having a cam-face 66. When the member 13 is swung to its upright operative position, therefore, the face 66 strikes the face 64 and causes the detent 62 to be depressed, a ledge 67 forming part of projection 65 passes by the detent 62, and the spring 63 actuates the detent 62 to enter the recess 68 at the rear of the ledge 67, in which manner the engaging-member 13 is effectively locked to the fixed sleeve member 6 in operative engagement with the spoke of the steering-wheel. The engaging member 13 is provided with a socket 69, within which there is secured a locking cylinder 70 having a usual rotatable barrel 71 operable by a usual key. To the barrel 71 is secured a projecting pin 72, and to the detent 62 is secured a pin 73 that passes through a vertical guide-slot 74 formed in a lug 75 forming part of the sleeve 6, with which lug the detent 62 is also mounted. When it is desired to unlock the engaging member 13, a key is inserted into the cylinder 70 and the barrel 71 therewith rotated, whereupon the pin 72 strikes the pin 73 and causes the detent 62 to be depressed, contrary to the pressure of spring 63, and to clear out of the recess 68 and from behind the ledge 67, thereby unlocking the member 13 and permitting it to be disengaged from the steering wheel and to be swung to its downward inoperative position. The bolts 53 are here shown provided with heads 76 to permit removal of the lock from the steering column 9 for repair or other purposes. A plate 77 provided with recesses 78 adapted to receive the heads 76 is secured to the sleeve-member 6 by screws 79 in the position shown to conceal the heads 76, and when the engaging member 13 is disposed in its locked operative position it bears against the plate 77, as shown and thereby prevents unauthorized access to the bolts 53 while the steering-wheel is in locked state.

The lock shown in Fig. 6 comprises a pair of engaging members 80, each of which is hinged at 81 to the sleeve member 6, and the two members are geared to each other by means of the gear-sectors 82 forming part thereof, whereby the engaging members 80 may be swung about their hinges downwardly, from their upright operative position shown to an opposite or inoperative position, and the swinging of either of these engaging members will simultaneously actuate the other to swing similarly upwardly or downwardly, as the case may be. Each of the members 80 is provided with an arm 83 which extends partially vertically and partially horizontally, and the said arms meet each other at 84, when the engaging members 80 are in their operative position shown, in which manner these arms not only prevent the steering of the wheel 3 but also prevent the entire removal of the steering wheel, as is sometimes resorted to by thieves, who often remove the wheel entirely and either replace it to therewith steer partially or else effect steering by grasping the steering post 1 with a wrench or other suitable contrivance. A spring 85 having the same function as the spring 59, described in connection with Fig. 5, is secured at its ends 86 to pins 87 fixed to the engaging members 80. This spring positively maintains the members 80 in their operative upright position shown, and when the engaging members are swung downwardly to their inoperative position this spring similarly retains them in the latter position. When the members 83 are swung to their midway or horizontal position they stretch the spring 85, and for the rest of their swinging strokes to upward or downward direction the spring automatically actuates the engaging members to complete these strokes and disposes the members automatically to either operative or inoperative position, as the case may be. The members 80 may be locked and unlocked to each other by means of a key operating the locking cylinder 88 mounted in one of the members to rotate the bolt 89, projecting within the other member 80, to either an operative or an inoperative position.

In the lock shown in Figs. 7, 8, the engaging member 90 is of semicircular configuration, and is rotatably pivoted at 91 within a casing 92 extending from the sleeve-member 6. Said casing comprises a plate 93, forming part of the sleeve-member 6, and a cup-like plate 94, which is secured to the plate 93 by means of screws 95, 96, which screws are inaccessible for unauthorized disassemblage of these parts after the sleeve members 6, 3 are permanently secured to each other by the bolts 12. The engaging member 90 is provided with a spoke 97 which extends from the end 98 of said member to a hub 99 which is pivotally mounted upon the screw 95, which thus acts as the pivot 91 for the member 90. Upon the hub 99 is formed a gear 100 and a cam 101, and a spring 102, secured to the spoke 97 at 103 and to the casing 92 at 104, normally draws the engaging member 90 so as to tend to revolve it in a counter-clockwise direction, as viewed in the drawings. If a semi-circular revolution is imparted to the member 90 in a clockwise direction, it will swing about its pivot 91 and be disposed to an inoperative position entirely within the casing 92, and, simultaneously, it will stretch the spring 102. If the member 90 is now released the spring 102 will cause it to be automatically revolved backwardly to the operative position shown, and in doing so the member 90 will emerge from the casing 92 through an opening 105, pass around the spoke 4 of the steering-wheel, and its terminal 106 will enter the opening 107 in the casing, whereby the member 90, together with the casing wall 108 will embrace the spoke 4 by completely encircling it. When the member 90 is thus disposed in operative state, a pawl 109 pivoted at 110 is caused by a spring 111 pressing thereagainst to enter into a recess 112 formed in the cam 101, whereby the member is locked securely in its operative position shown. The casing portion 94 is provided with a socket 113 within which there is mounted a locking cylinder 114 having a key operated rotatable barrel 115 to the end of which there is secured a gear sector 116 adapted to mesh with the gear 100. When it is desired to unlock the member 90 to disengage it from the spoke 4 the gear sector 116 is rotated in the direction of the arrow, by actuation of the key, and thereupon a cam-piece 117 forming part of said gear-sector strikes the pawl 109 and thereby disengages it from the cam 101, and then the gear-sector 116 meshes with the gear 100 and rotates the latter to revolve the member 90 to its inoperative position within the casing 92. At this moment a detent 43, similar to this same element shown in Fig. 1 and having the same function, enters above the terminal 106 of the engaging member 90, and thereby automatically locks the latter in its inoperative state within the casing 92. In order to now lock the member 90 in its operative position in engagement with the spoke 4, it merely requires withdrawal of the detent 43, by drawing the ball 46, whereupon the member 90 becomes released and is automatically actuated to its operative position, and the pawl 109 automatically enters into the recess 112 of the cam 101 and thereby automatically locks the member 90 in its operative engagement with the spoke 4. It will be evident that this lock, like that shown in Fig. 6, will similarly prevent the unauthorized removal of the wheel 3, in addition to preventing the steering thereof. It will be also evident that by eliminating the spring 102 and the detent 43 the engaging member 90 may be locked and unlocked by the direct actuation of the locking key.

Variations may be resorted to within the scope of the invention, and portions of the improvements may be used without others.

Having thus described my invention, I claim:—

1. An automobile steering wheel lock having the combination of means to secure it to a stationary member, means for engaging the wheel movable toward and away therefrom, means to automatically actuate said last means to engage the wheel, means to automatically lock said engaging means in operative position, and means to automatically lock said engaging means in inoperative position.

2. An automobile steering wheel lock having the combination of means to secure it to the steering column, means for engaging the wheel movable upwardly to engage the wheel and downwardly to disengage the wheel, a spring to actuate said engaging means upwardly, a detent to lock said engaging means in operative position, a spring to actuate said detent to perform its locking action, a detent to lock said engaging means in inoperative position, and a spring to actuate said detent to perform its locking action.

3. An automobile steering wheel lock having the combination of means to secure it to a stationary member, means for engaging the wheel movable to operative and inoperative positions, means to lock and unlock said engaging means in operative position, means to lock and unlock said engaging means in inoperative position, and said engaging means being automatically locked in its inoperative position upon its being actuated to the inoperative position.

4. An automobile steering wheel lock having the combination of means to secure it to a stationary member, means for engaging the wheel movable to operative and inoperative positions, means to lock and unlock said engaging means in operative position, means to lock and unlock said engaging means in inoperative position, said engaging means being automatically actuated to its operative position and locked in its operative position upon its being unlocked from its inoperative position, and said engaging means being automatically locked in its inoperative position upon its being actuated to the inoperative position.

5. An automobile steering wheel lock having the combination of a sleeve for mounting it upon the steering column, means to secure said sleeve to said column, said sleeve having a recess, and a curved body located in said recess acting on said column to bind it to said sleeve to prevent dislocation of said sleeve upon the accidental loosening of said securing means.

6. An automobile steering wheel lock having the combination of means to secure it to a stationary member, means for engaging the wheel movable in an arc, and means to automatically actuate said last means to engage the wheel.

7. A lock comprising a casing, an arc bolt having a hub pivotally mounted on said casing, spring means for projecting said bolt, and means mounted on said casing and engaging said hub to retain the bolt in its projected position.

8. An automobile steering wheel lock having the combination of means to secure it to the steering post, means for engaging the wheel slidable upwardly to engage the wheel and downwardly to disengage the wheel, a spring to actuate said engaging means upwardly, a spring-pressed detent automatically locking said engaging means in operative position, a locking device adapted to move toward and away from said engaging means, said device withdrawing said detent when moving away from said engaging means, and means to automatically lock said engaging means in inoperative position.

9. An automobile steering wheel lock having the combination of means to secure it to the steering post, means for engaging the wheel slidable upwardly to engage the wheel and downwardly to disengage the wheel, a spring to actuate said engaging means upwardly, a spring-pressed detent automatically locking to lock said engaging means in operative position, a locking device to actuate said detent to unlock said engaging means, and means to automatically lock said engaging means in inoperative position.

JOHN HOLTZMAN.